(12) United States Patent
Zhou

(10) Patent No.: US 11,392,216 B2
(45) Date of Patent: Jul. 19, 2022

(54) RETRACTABLE COMPUTER KEYBOARD WITH HAND-PAINTED PLATE AND USING METHOD THEREOF

(71) Applicant: Pentagon Maple Leaf Information Technologies of Kunshan Co., Ltd., Kunshan (CN)

(72) Inventor: Lianhui Zhou, Kunshan (CN)

(73) Assignee: ALPINE ALA TECHNOLOGIES OF SHANGHAI CO., LTD., Shanghai (CN)

( * ) Notice: Subject to any disclaimer, the term of this patent is extended or adjusted under 35 U.S.C. 154(b) by 0 days.

(21) Appl. No.: 16/771,006

(22) PCT Filed: Sep. 18, 2018

(86) PCT No.: PCT/CN2018/106082
§ 371 (c)(1),
(2) Date: Jun. 9, 2020

(87) PCT Pub. No.: WO2020/051929
PCT Pub. Date: Mar. 19, 2020

(65) Prior Publication Data
US 2021/0181862 A1    Jun. 17, 2021

(30) Foreign Application Priority Data
Sep. 10, 2018 (CN) .......................... 201811051707.X

(51) Int. Cl.
| G06F 1/20 | (2006.01) |
| G06F 3/02 | (2006.01) |
| G06F 3/041 | (2006.01) |
| G06F 3/0354 | (2013.01) |

(52) U.S. Cl.
CPC ............ *G06F 3/0221* (2013.01); *G06F 3/021* (2013.01); *G06F 3/03545* (2013.01); *G06F 3/04162* (2019.05)

(58) Field of Classification Search
CPC .......................................... G06F 3/021–04162
See application file for complete search history.

(56) References Cited

U.S. PATENT DOCUMENTS 5,537,343 A * 7/1996 Kikinis .................. G06F 1/206
361/679.56

FOREIGN PATENT DOCUMENTS

| CN | 102483675 A | * | 5/2012 | ............. G06F 3/041 |
| CN | 109002196 A | * | 12/2018 | ......... G06F 3/03545 |

* cited by examiner

*Primary Examiner* — Lin Li

(57) ABSTRACT

The invention discloses a retractable computer keyboard with a hand-painted board and a using method thereof, comprising a support plate, a soft silicone keyboard and a coil spring strip, wherein the kickstand pad is provided with a hand-painted screen with a telescopic a switch, a power indicator is arranged under the telescopic switch, a circuit board is arranged in the kickstand pad, a MCU is arranged on the circuit board, an air pump is arranged on one side of the single chip, and a tee pipe is arranged under the air pump, the aerating tube is arranged under the tee pipe, and the fixing board is provided with a fixing groove with aerifours orifices. The utility model has the advantages such as speeding up of the keyboard unfolding, reducing the space occupation and the overall thickness of the soft silicone keyboard and convenient for storage.

10 Claims, 8 Drawing Sheets

RETRACTABLE COMPUTER KEYBOARD WITH HAND-PAINTED PLATE AND USING METHOD THEREOF

TECHNICAL FIELD

The present invention relates to the field of computer keyboards, and to a retractable computer keyboard with a hand-painted board and using method thereof.

BACKGROUND TECHNIQUE

Hand-painted boards and keyboards are important input peripheral for computers, the hand-painted boards are usually made up of a board and a pressured pen, which, to painting creator, just like the painter's easel and brush, this painting function of which is beyond comparable to the keyboard and the tablet, which is mainly suitable for designing, for teachers and students of fine art related, advertising agents and for design studios and for vector anime makers by Flash.

Referring to the Chinese patent application No. 201810080753.6—a retractable computer keyboard with hand-painted board discloses that which, comprising a computer keyboard body with a kickstand device, a keyboard body and a propping back plate, and the kickstand device includes a supporting leg, at which the rotating lever are arranged at one end of the support leg, and the supporting leg is mounted on the supporting leg by a rotating lever, and the other end of the support leg is provided with a pulley. As the device of this patent folds the hand-painted board and the keyboard together, it increases the overall thickness and occupies more space.

SUMMARY OF THE INVENTION

Retractable Computer Keyboard with Hand-Painted Board and Using Method Thereof of the present invention is disclosed to resolve the above problems for reducing the thickness of a retractable computer keyboard with a hand-painted board. Therefore, an innovative device is designed by utilizing a pneumatic-activating and automatic soft silicone keyboard to speed up the keyboard unfolding, and at the same time, a storage with coil spring spooling is provided for soft silicone keyboard, reducing the space occupancy and thickness of the soft silicone keyboard, and the hand-held pen is pinned into the placement slot of the underlying beam, which enable the overall structure is more compact.

The present invention achieves the above objects by the following technical solutions:

The patent of a retractable computer keyboard with a hand-painted board comprises a kickstand pad, a soft silicone keyboard and a coil spring strip; the kickstand pad is provided with a hand-painted screen, and one side of the hand-painted screen is provided with a telescopic switch, beneath of which is arranged a power indicator, inside the kickstand pad there is devised a circuit board with a MCU built-in, its type is C51; an air pump of model ASD-300DC is arranged on one side of the MCU and is provided with a tee pipe, beneath of which, the aerating tube is arranged; below the kickstand pad is arranged with a fixed groove with aeriferous orifices, below the fixed groove is provided with a soft keyboard with a button, below the button is arranged with a piezoelectric switch, beneath of which, is arranged a sachet of air storage; below the soft keyboard is arranged with a underlying beam with a placement slot, which is devised with a hand-drawn pen, one side of which, is devised with a finger crypt, on a bottom of the hand-drawn pen is arranged a semi-circular stylus; and the top of the underlying beam is arranged coil spring strip, in the middle of the back of the kickstand pad is arranged with a spooling slot with a spooling hook, to the upper of which, a USB cable is provided with, and a USB plug is devised on the USB cable, and above the spooling slot is provided a groove of wire inlaid, below which, a nameplate board is devised.

In this embodiment, a protective cover is provided and glued at the back of the soft silicone keyboard, whereby, the protective cover is used for fixed connecting the coil spring strip and the soft silicone keyboard, and the glue boost the connection strength of the protective sleeve, ensuring the soft silicone keyboard stable and reliable; the soft silicone keyboard is made of a soft rubber material, and is respectively glue upon the fixed groove and the underlying beam, whereby, the soft rubber material keeps the soft silicone keyboard furled. In this embodiment, the surface of the hand-drawn pen is provided with and glued a non-skid sleeve to increases the frictional force against the hand from sliding; a suction pad is arranged and glued at the back of the underlying beam, whereby, the suction pad is easily opened with robust durable life. In this embodiment, the coil spring strip is of spring steel material and is riveted at the underlying beam for guard of the bounce force of the coil spring strip and its strength; the corners of the back of the kickstand pad are provided with non-skid pads, which are connected to the kickstand pad by bolts for the stability of the kickstand in use, and the bolts make disassembling and replacing the non-skid pad much easier. In this embodiment, the USB cable is wound on the spooling hook, the height of which is less than the depth of the spooling slot in case of the kickstand pad being jacked up, and the USB plug is welded at the USB cable for its convenient opening and reliability; the MCU is electrically connected to respectively the telescopic switch, the power indicator, the hand-painted screen, the air pump and the piezoelectric switch for transmitting control signals.

In this embodiment, the specific usage method includes the following steps:
  a) the USB cable is pulled out and fixed inside the groove of wire inlaid, and the USB plug is connected to a computer, the power indicator is lit;
  b) pressing the telescopic switch, the MCU activates the air pump to compresses air, and blows compressed air via the tee pipe and the aerating tube into the air storage sachet, which is inflated to unfurl the soft keyboard by overcoming the curling bounce of the coil spring strip;
  c) when pressing the button, the piezoelectric switch transmits the collected signal to the MCU, which inputs data to the computer, as the hand-drawn pen is taken out from said placement slot of the underlying beam to draw on the hand-painted screen, which transmits the collected graphic information to the MCU, inputting graphs to the computer;
  d) as above operation is completed, pressing the telescopic switch once again, the MCU turns off the air pump, blocking off the compressed air into the air storage sachet, the soft silicone keyboard is furled up beneath the kickstand pad by means of the curling bounce of the coil spring strip.

In comparison with the prior arts, the beneficial effects of the present invention are resulted as follows:
  1. the air pump is employed to speed up the keyboard unfurling;

2. the coil spring strip is employed to reduce the space of the soft silicone keyboard occupying and its overall thickness, which is convenient for placement;
3. the hand-held pen is tucked in the placement slot, downsizing the overall structure.

DRAWINGS

In order to clearly illustrate the embodiments of the present invention or the technical solutions of the prior arts, the accompanying drawings in the embodiments or in the description of the prior art will be briefed below. Obviously, the drawings in the following description are only confined to some embodiments of the present invention, and other drawings can be obtained from those skilled in the art without inventive labour.

Figure 1:
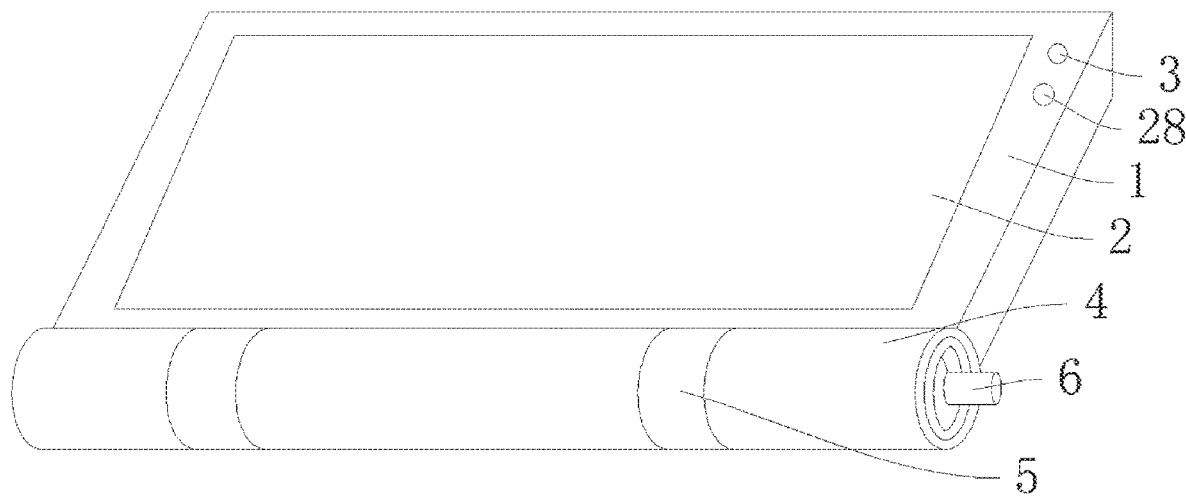
FIG. 1 shows the schematic view showing furling of the retractable computer keyboard with hand-painted board according to the present invention.

The reference numerals are as follows:
1 kickstand pad 2 hand-painted screen 3 telescopic switch 4 soft silicone keyboard 5 protective cover 6 hand-drawn pen 7 button 8 circuit board 9 MCU 10 air pump 11 tee pipe 12 aerating tube 13 aeriferous orifice 14 non-skid mat 15 spooling groove 16 spooling hook 17 groove of wire inlaid 18 USB cable 19 USB plug 20 piezoelectric switch 21 air storage sachet 22 underlying beam 23 placement slot 24 suction pad 25 coil spring 26 non-skid sleeve 27 semi-circular stylus 28 power indicator 29 finger crypt 30 nameplate board 31 fixed slot

DETAILED DESCRIPTION OF THE INVENTION

In the description of the present invention, it is to be understood that the terms "center", "longitudinal", "transverse", "upper", "lower", "front", "back", "left", "right", the orientation or positional relationship of the indications of "upright", "horizontal", "top", "bottom", "inside", "outside", etc. is based on the orientation or positional relationship shown in the drawings, only for the convenience of describing the present invention and the simplified description, which is not intended to indicate or imply that the device or elements in question have a definite orientation, configuration and operation in a particular orientation, which is not limiting the scope of the invention; moreover, the terms of "first", "second" and the like mean descriptiveness only, and should not be construed as indicating or implying a relative importance or the number of technical characteristics. Thus, the definition of "first", "second", etc. may include one or more technical characteristics by explicitly or implicitly; in the description of the present invention, "plurality" means two or more unless otherwise stated, and "installation" and "connected" are understood in broad meanings, being fixed or detachable, mechanical or electrical, directly or indirectly connected through an intermediate medium, for example, unless otherwise explicitly defined. The specific meaning of the above terms in the present invention can be understood by a person with ordinary skill in the art.

The present invention will be further described below by the accompanying drawings:

1 kickstand pad 2 hand-painted screen 3 telescopic switch 4 soft silicone keyboard 5 protective cover 6 hand-drawn pen 7 button 8 circuit board 9 MCU 10 air pump 11 tee pipe 12 aerating tube 13 aeriferous orifice 14 non-skid mat 15 spooling groove 16 spooling hook 17 groove of wire inlaid 18 USB cable 19 USB plug 20 piezoelectric switch 21 air storage sachet 22 underlying beam 23 placement slot 24 suction pad 25 coil spring strip 26 non-skid sleeve 27 semi-circular stylus 28 power indicator 29 finger crypt 30 nameplate board 31 fixed slot Embodiment 1

Figure 2:
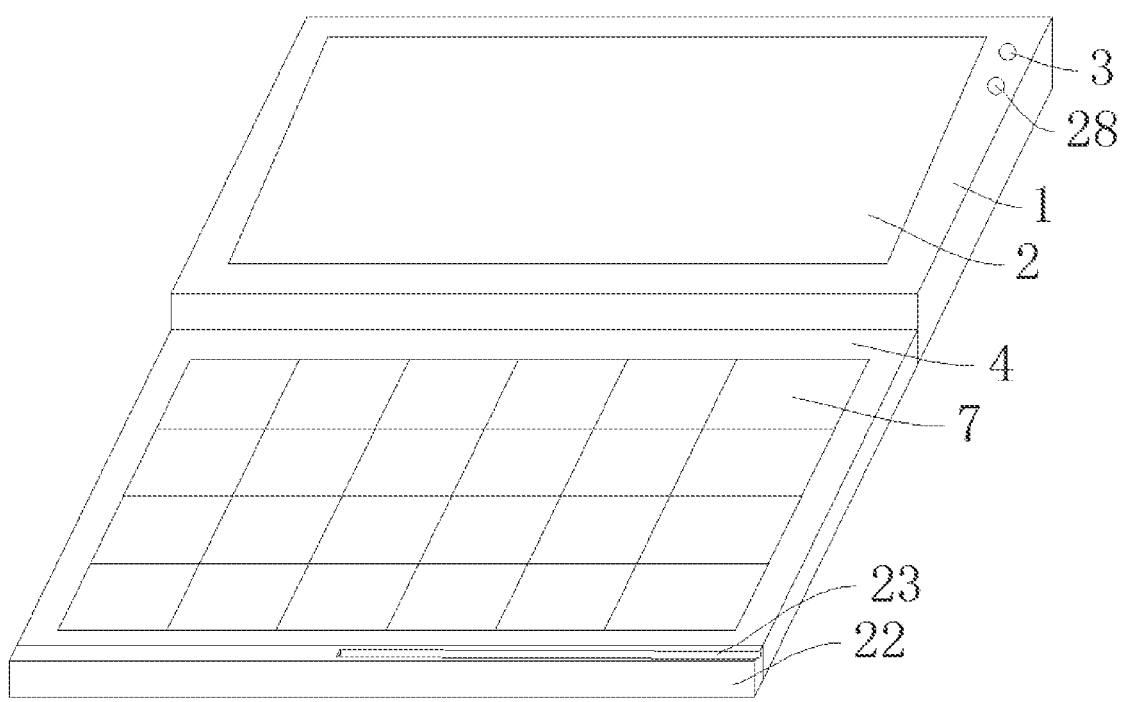
FIG. 2 shows the schematic exploded view of a retractable computer keyboard with hand-painted board according to the present invention.
Figure 3:
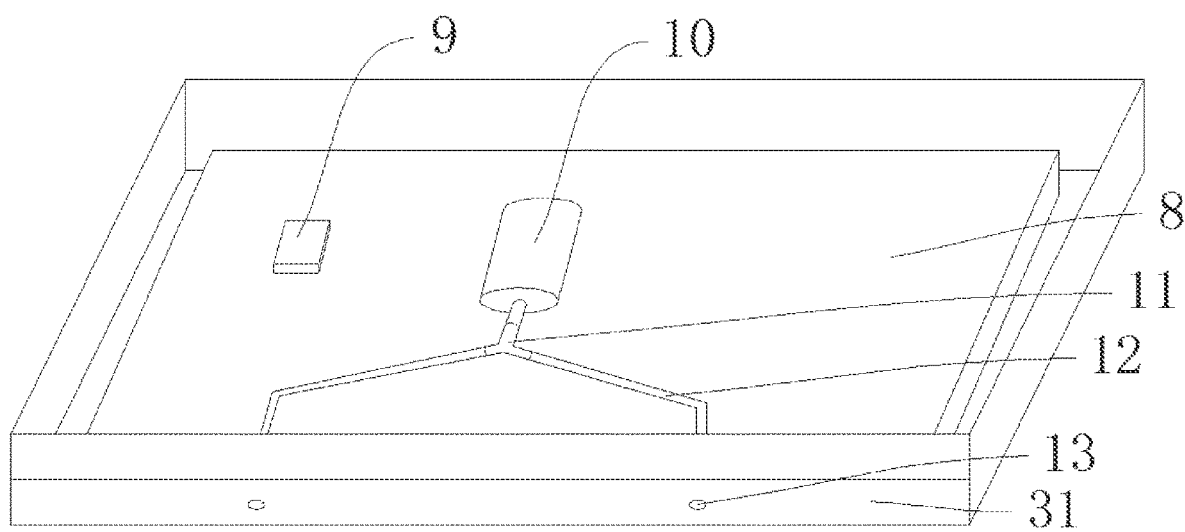
FIG. 3 shows the perspective view of the kickstand pad of the retractable computer keyboard with hand-painted board according to the present invention.
Figure 4:
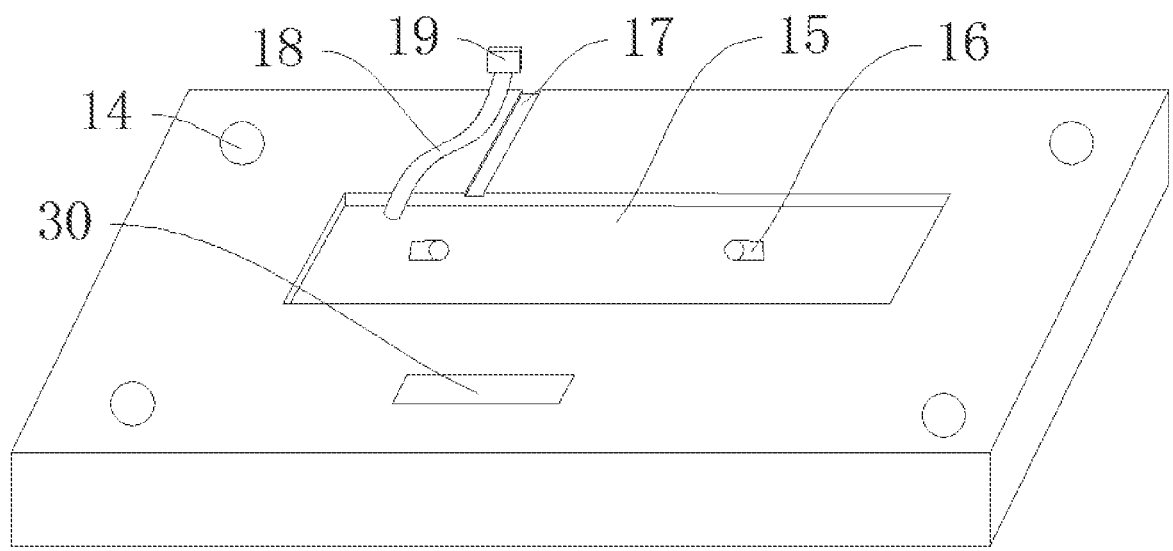
FIG. 4 shows the rear view of a kickstand pad of the retractable computer keyboard with hand-painted board according to the present invention.
Figure 5:
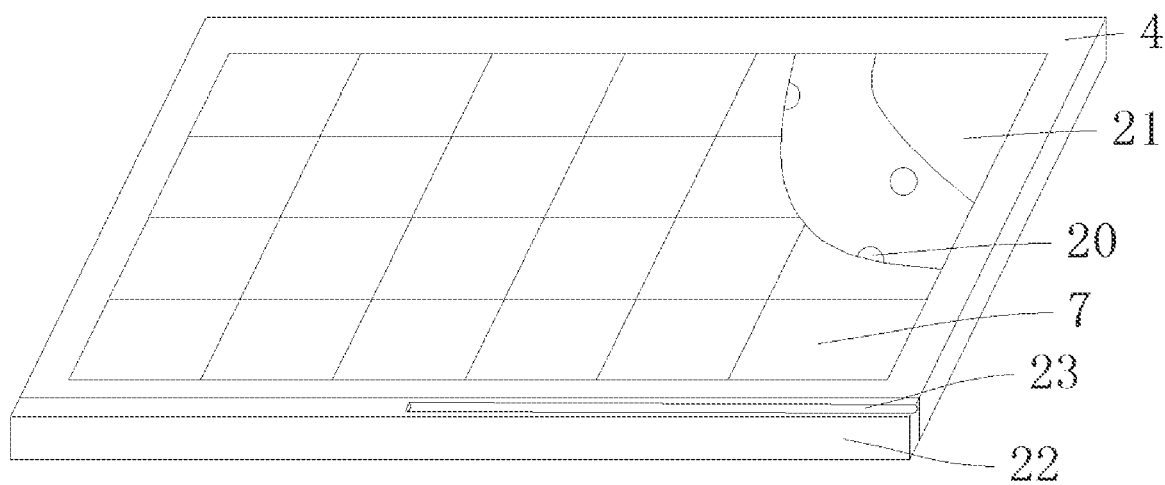
FIG. 5 shows the schematic view of the soft silicone keyboard of the retractable computer keyboard with hand-painted board according to the present invention.
Figure 6:
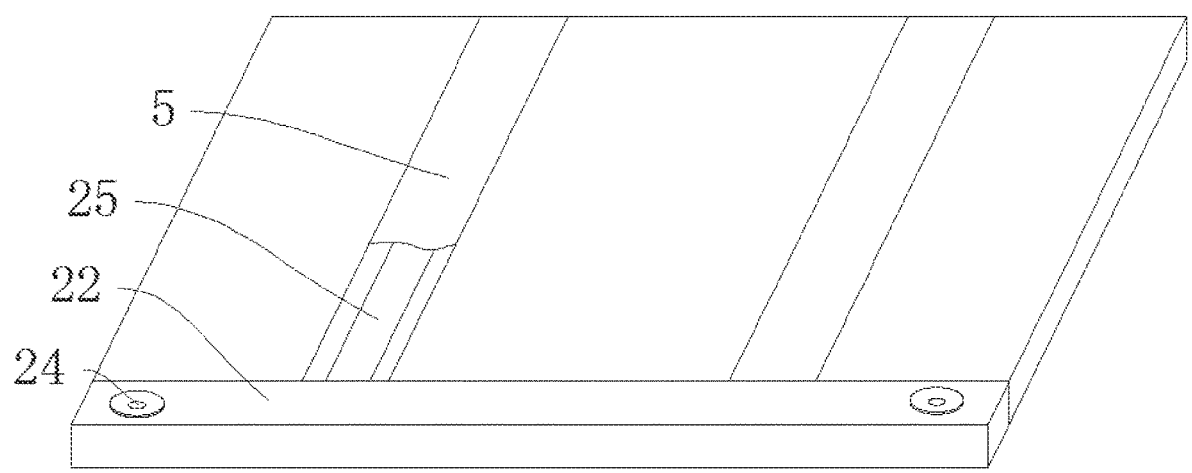
FIG. 6 shows the rear view of the soft silicone keyboard of the retractable computer keyboard with hand-painted board according to the present invention.
Figure 7:
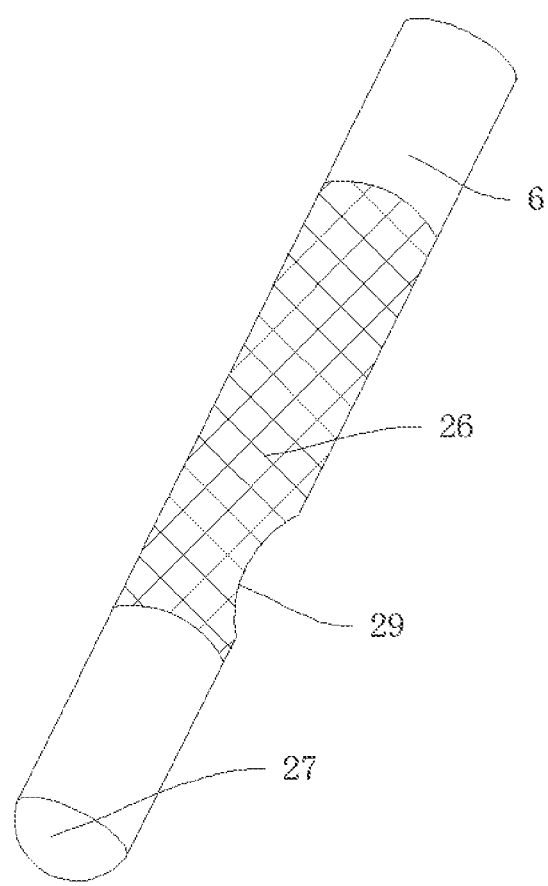
FIG. 7 shows the schematic view of the hand-drawn pen of the retractable computer keyboard with hand-painted board according to the present invention.
Figure 8:
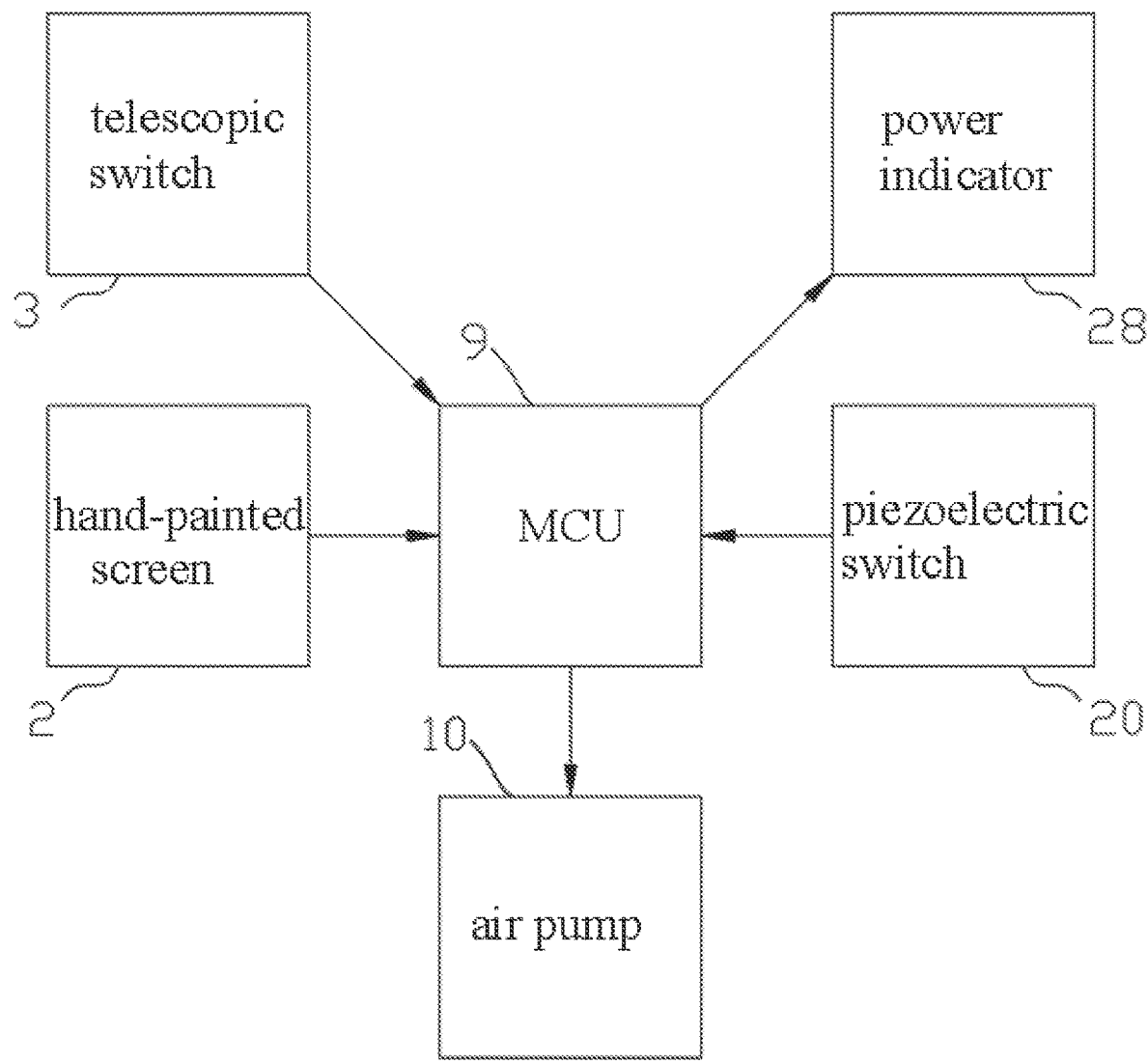
FIG. 8 shows the block diagram showing the circuit structure of the retractable computer keyboard with hand-painted board according to the present invention.

As shown in FIG. 1-8, the retractable computer keyboard with hand-painted board comprises a kickstand pad 1, a soft silicone keyboard 4, a coil spring 25; a hand-painted screen 2 is arranged upon the kickstand pad 1 to collect hand-drawn graphics; a telescopic switch 3 is arranged on the side of the hand-painted screen 2, and an air pump 10 is activated. The power indicator 28 is arranged under the telescopic switch 3, and the power on-and-off state is displayed; the kickstand pad 1 is provided with a circuit board 8 with a MCU 9 built-in to analyze and process data, the air pump 10 is arranged on one side of MCU 9 to output and branch off compressed air, the air pump 10 is provided with a tee pipe 11, below which is arranged an aerating tube to transmit compressed air. A fixed groove 31 is arranged below the kickstand pad 1 to fix the soft silicone keyboard 4; the fixed groove 31 is provided with an aeriferous orifice 13 to exhale compressed air; on the top of the soft silicone keyboard 4 is arranged with the button 7 to protect the piezoelectric switch 20, below the button 7 is provided with a piezoelectric switch 20 to collect and input signals, below piezoelectric switch 20 is an air storage sachet 21 for storing compressed air. Below an underlying beam 22 is provided with the soft silicone keyboard 4, upon the underlying beam 22 is devised with a placement slot 23 for holding a hand-drawn pen 6 for convenient drawing. One side of the hand-drawn pen 6 is provided with a finger crypt 29 to hold user's finger, a semi-circular head 27 is arranged at the bottom of the hand-drawn pen 6 in case of scratching the surface of the hand-painted screen 2; the top of the underlying beam 22 is provided with a coil spring strip 25 to produce a spring force. at the middle of back of the kickstand pad 1 is arranged a spooling slot 15, in which, a spooling hook 16 is devised the spooling slot 15 is for roomed the USB cable 18 with a USB plug 19 connecting to the computer for transmitting data; above the spooling slot 15 is arranged a groove of wire inlaid 17 for embedding the USB cable 18, below the spooling slot 15 is provided with a nameplate board 30 rating the parameters.

Embodiment 2

The difference between this embodiment and Embodiment 1 is that: the back of the soft silicone keyboard 4 is arranged and glued with a protective cover 5 to fix the coil spring strip 25 and the soft silicone keyboard 4, also the gluing strengthens the connection of the protective cover 5.

In this embodiment, the specific usage method includes the following steps:
- a) said USB cable 18 is pulled out and fixed inside said groove of wire inlaid 17, and the USB plug 19 is connected to a computer, said power indicator 28 is lit;
- b) said telescopic switch 3 is pressed down, said MCU 9 activates the air pump 10 to compresses air and blow the compressed air, via the tee pipe 11 and the aerating tube 12, into said air storage sachet 21, which is inflated to unfurl said soft keyboard 4 by overcoming the curling bounce of the coil spring strip 25;
- c) as the button 7 is pressed, said piezoelectric switch 20 transmits the collected signal to said MCU 9, which inputs data to the computer, as said hand-drawn pen 6 is taken out from said placement slot 23 of said underlying beam 22 to draw on the hand-painted screen 2, which transmits the collected graphic information to MCU 9, inputting graphs to the computer;
- d) as above operation is completed, pressing the telescopic switch 3 once again, MCU 9 turns off the air pump 10, blocking off the compressed air into said air storage sachet 21, said soft silicone keyboard 4 is furled up beneath said kickstand pad 1 by means of the curling bounce of the coil spring strip 25.

The basic principles, main features and advantages of the present invention above-mentioned should be understood by those skilled in the art that it is not confined to the foregoing embodiments; without divergent from the spirit and scope of the invention, varieties and modifications derived from the foregoing embodiment and its description are intended to be included within the scope of the invention as claimed.

The invention claimed is:

1. A retractable computer keyboard with a hand-painted board, comprising: a kickstand pad, a soft silicone keyboard and a coil spring strip; a hand-painted screen is arranged upon said kickstand pad, a telescopic switch is arranged on one side of said hand-painted screen, a power indicator is arranged below said telescopic switch and a circuit board is built inside said kickstand pad; said circuit board is provided with a microcircuit unit/MCU, an air pump is arranged on one side of said MCU, and a tee pipe is arranged below said air pump, a aerating tube is arranged below said tee pipe, a fixed groove is arranged below said kickstand pad and an aerating orifices is arranged on said fixed groove; said soft silicone keyboard is arranged below said fixed groove, said soft silicone keyboard is provided with a button, and a piezoelectric switch is below said button; an air storage sachet is arranged below said piezoelectric switch, an underlying beam is arranged below said soft silicone keyboard, and a placement slot is arranged on said underlying beam, a hand-drawn pen is arranged in said placement slot, and a finger crypt is arranged on one side of said hand-drawn pen, and a bottom of said hand-drawn is provided with a semicircular stylus; a top of said underlying beam is provided with said coil spring strip, and a spooling slot is arranged in the middle of said back of said kickstand pad, a spooling hook is arranged inside said spooling slot, an USB cable is arranged above said spooling hook, and an USB plug is arranged on said USB cable; a groove of wire inlaid is arranged above said spooling slot, below which, a nameplate board is devised.

2. A retractable computer keyboard with a hand-painted board according to claim 1, wherein the back of said soft silicone keyboard is provided and glued with a protective cover.

3. A retractable computer keyboard with a hand-painted board according to claim 2, wherein said soft silicone keyboard is made of a soft silicone material, and is respectively attached to said fixed groove and said underlying beam.

4. A retractable computer keyboard with a hand-painted board according to claim 3, wherein said surface of said hand-drawn pen is provided with a non-skid sleeve, which is glued upon said hand-drawn pen.

5. A retractable computer keyboard with a hand-painted board according to claim 4, wherein a suction pad is arranged at said back of said underlying beam and is glued to said underlying beam.

6. A retractable computer keyboard with a hand-painted board according to claim 5, wherein said coil spring strip is made of a spring steel material and is riveted to said underlying beam.

7. A retractable computer keyboard with a hand-painted board according to claim 6, wherein the four corners of said back of said kickstand pad are provided with a non-skid pad, to which said kickstand pad is connected by bolts.

8. A retractable computer keyboard with a hand-painted board according to claim 7, wherein said USB cable is wound around said spooling hook, and the height of said spooling hook is less than the depth of said spooling slot, and said USB plug is welded to said USB cable.

9. A retractable computer keyboard with a hand-painted board according to claim 8, wherein said MCU is electrical connected to said telescopic switch, said power indicator, said hand-painted screen, said air pump and said piezoelectric switch respectively.

10. A method for using a retractable computer keyboard with a hand-painted board, wherein:
- a USB cable is pulled out and fixed inside said groove of wire inlaid, and an USB plug is connected to a computer, said power indicator is lit;
- said telescopic switch is pressed down, a MCU activates an air pump to compress air and blow compressed air via a tee pipe and an aerating tube into said air storage sachet, which is inflated to unfurl said soft keyboard by overcoming a curling bounce of a coil spring strip;
- a button is pressed, said piezoelectric switch transmits a collected signal to said MCU, which inputs data to said computer, as said hand-drawn pen is taken out from a placement slot of an underlying beam for drawing on a hand-painted screen, which transmits collected graphic information to MCU, and feed graphs to said computer;
- as above operation is completed, pressing said telescopic switch once again, MCU turns off said air pump, blocking off the compressed air into said air storage sachet, said soft silicone keyboard is furled up beneath said kickstand pad by means of said curling bounce of said coil spring strip.

\* \* \* \* \*